United States Patent
Tai et al.

(10) Patent No.: US 8,482,802 B2
(45) Date of Patent: Jul. 9, 2013

(54) SCREENED HARDCOPY REPRODUCTION APPARATUS WITH COMPENSATION

(75) Inventors: Hwai-Tzuu Tai, Rochester, NY (US); Chung-Hui Kuo, Fairport, NY (US); Stacy M. Munechika, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 278 days.

(21) Appl. No.: 12/748,762

(22) Filed: Mar. 29, 2010

(65) Prior Publication Data
US 2011/0235059 A1    Sep. 29, 2011

(51) Int. Cl.
G06F 3/12 (2006.01)
H04N 1/405 (2006.01)

(52) U.S. Cl.
USPC .............. 358/3.06; 358/1.1; 358/1.9

(58) Field of Classification Search
USPC ........................... 358/3.06, 1.1, 1.9
See application file for complete search history.

(56) References Cited

U.S. PATENT DOCUMENTS

| | | | |
|---|---|---|---|
| 5,485,289 | A | 1/1996 | Curry |
| 5,546,165 | A | 8/1996 | Rushing et al. |
| 6,917,448 | B2 | 7/2005 | Koifman et al. |
| 7,038,816 | B2 | 5/2006 | Klassen et al. |
| 2002/0057470 | A1 | 5/2002 | Koide et al. |
| 2005/0036705 | A1 | 2/2005 | Viassolo et al. |
| 2005/0134624 | A1 | 6/2005 | Mizes |
| 2005/0243340 | A1 | 11/2005 | Tai et al. |
| 2006/0066924 | A1* | 3/2006 | Delueg ................ 358/506 |
| 2006/0139353 | A1* | 6/2006 | Washio ................ 345/467 |
| 2006/0290731 | A1 | 12/2006 | Ishii et al. |
| 2007/0041065 | A1 | 2/2007 | Kubo et al. |
| 2007/0081205 | A1* | 4/2007 | Tai et al. ............... 358/515 |
| 2007/0139733 | A1 | 6/2007 | Mizes et al. |

FOREIGN PATENT DOCUMENTS

EP    0 892 549 B1    11/2001

OTHER PUBLICATIONS

Mizes et al., "Scanner-based Technique to Adjust LED Printbar Uniformity," IS&T NIP19, pp. 532-536, ISBN 0-89208-247-X, Sep. 28, 2003.

Mizes et al., "Automatic Density Control for Increased Print Uniformity and Printer Reliability with Inline Linear Array Sensing," IS&T NIP24, pp. 206-210, ISBN 978-0-89208-279-7, Sep. 6, 2008.

* cited by examiner

Primary Examiner — Charlotte M Baker
(74) Attorney, Agent, or Firm — Kevin E. Spaulding

(57) ABSTRACT

Screened hardcopy reproduction apparatus for applying toner to a receiver using a print engine that may not apply toner uniformly, so the toner applied to the receiver has a non-uniformity. A controller receives an input pixel level and a corresponding input pixel location; a tone-reproduction unit calculates an output pixel level from the input pixel level and a corresponding output pixel location from the input pixel location; a compensator calculates a compensated pixel level from the output pixel level and the output pixel location; and a screening unit calculates a screened pixel level and a screened pixel location from the compensated pixel level, the output pixel location, and a selected screening pattern. The print engine applies an amount of the toner corresponding to the screened pixel level and the non-uniformity to the receiver at a toner location corresponding to the screened pixel location to compensate for the non-uniformity.

12 Claims, 16 Drawing Sheets

SCREENED HARDCOPY REPRODUCTION APPARATUS WITH COMPENSATION

CROSS-REFERENCE TO RELATED APPLICATIONS

Reference is made to commonly assigned, co-pending U.S. patent application Ser. No. 12/577,233, filed Oct. 12, 2009, entitled "ADAPTIVE EXPOSURE PRINTING AND PRINTING SYSTEM," by Kuo et al., and commonly assigned, U.S. patent application Ser. No. 12/748,786 filed Mar. 29, 2010 (U.S. Publication No. 2011/0235060), entitled "SCREENED HARDCOPY REPRODUCTION APPARATUS COMPENSATION DATA CALCULATION," by Tai, et al., the disclosures of which are incorporated by reference herein.

FIELD OF THE INVENTION

This invention pertains to the field of electrophotographic printing and more particularly to compensation for printing non-uniformities.

BACKGROUND OF THE INVENTION

Electrophotography is a useful process for printing images on a receiver (or "imaging substrate"), such as a piece or sheet of paper or another planar medium, glass, fabric, metal, or other objects as will be described below. In this process, an electrostatic latent image is formed on a photoreceptor by uniformly charging the photoreceptor and then discharging selected areas of the uniform charge to yield an electrostatic charge pattern corresponding to the desired image (a "latent image").

After the latent image is formed, toner particles are given a charge substantially opposite to the charge of the latent image, and brought into the vicinity of the photoreceptor so as to be attracted to the latent image to develop the latent image into a visible image. Note that the visible image may not be visible to the naked eye depending on the composition of the toner particles (e.g. clear toner).

After the latent image is developed into a visible image on the photoreceptor, a suitable receiver is brought into juxtaposition with the visible image. A suitable electric field is applied to transfer the toner particles of the visible image to the receiver to form the desired print image on the receiver. The imaging process is typically repeated many times with reusable photoreceptors.

The receiver is then removed from its operative association with the photoreceptor and subjected to heat or pressure to permanently fix ("fuse") the print image to the receiver. Plural print images, e.g. of separations of different colors, are overlaid on one receiver before fusing to form a multi-color print image on the receiver.

Electrophotographic (EP) printers typically transport the receiver past the photoreceptor to form the print image. The direction of travel of the receiver is referred to as the slow-scan or process direction. This is typically the vertical (Y) direction of a portrait-oriented receiver. The direction perpendicular to the slow-scan direction is referred to as the fast-scan or cross-process direction, and is typically the horizontal (X) direction of a portrait-oriented receiver. "Scan" does not imply that any components are moving or scanning across the receiver; the terminology is conventional in the art.

To accommodate hardware limitations and reduce noise, EP printers typically use screened patterns (e.g. halftones) rather than continuous tones. Marks on the receiver are placed according to a variety of geometrical patterns so that a group of marks, when seen by the eye, gives a rendition of a desired intermediate color tone between the color of the background (e.g. paper stock) and the color of the mark. U.S. Pat. No. 5,485,289 to Curry, and commonly assigned EP 0 892 549 B1 to Tai et al., describe various methods for halftoning and designing screening patterns.

Tai et al. also recognize that EP printheads have non-uniformities. For example, non-uniform exposure of an area intended to be constant density on the receiver can result in a streak, an area unintentionally exposed differently than its surround, extending in the slow-scan direction. Some streaks are consistently lighter or darker than their surrounds, corresponding e.g. to consistent over- or under-exposure on the photoreceptor. However, some streaks are lighter than their surround in some areas and darker than their surround in other areas. There is a need to compensate for both types of streaks.

U.S. Patent Application Publication No. 2005/0036705 to Viassolo et al., and U.S. Pat. No. 7,038,816 to Klassen et al., describe systems to reduce streaking by adjusting tone reproduction curve (TRC) values. However, adjusting TRC values confounds streaking-reduction with the intended purpose of TRC values, which is compensating for device non-linearities. This can increase memory requirements of a printer and restrict the available compensation to the range of adjustment provided by the TRC.

U.S. Patent Application Publication No. 2005/0134624 to Mizes describes various test patterns that can be printed on a receiver and scanned to determine streaking-compensation values. "Scanner-based technique to adjust LED printbar uniformity" by Mizes et al. (IS&T NIP19 pp. 532-536, ISBN 0-89208-247-X, dated Sep. 28, 2003) also describes test patterns and schemes for compensation. "Automatic density control for increased print uniformity and printer reliability with inline linear array sensing" by Mizes et al. (IS&T NIP24 pp. 206-210, ISBN 978-0-89208-279-7, dated Sep. 6, 2008) describes capturing an image of a test pattern strip to perform compensation. However, these schemes use TRCs for compensation, so suffer from the same limitations as Viassolo et al. and Klassen et al. Additionally, Mizes et al. [NIP 19] disclose that some observers can perceive density variations with a peak-to-peak amplitude of only $0.25\Delta L^*$. However, Mizes et al. require extensive and time-consuming measurements to reach high precision.

There is a continuing need, therefore, for an improved way of compensating for streaks and other non-uniformities in a hardcopy reproduction apparatus which uses screening.

SUMMARY OF THE INVENTION

According to the present invention, there is provided screened hardcopy reproduction apparatus for applying toner to a receiver, comprising:

a. a print engine for applying the toner to the receiver, wherein the print engine may not apply toner uniformly, whereby the toner applied to the receiver has a non-uniformity;

b. a controller for receiving an input pixel level and a corresponding input pixel location;

c. a tone-reproduction unit for calculating an output pixel level from the input pixel level and a corresponding output pixel location from the input pixel location;

d. a compensator for calculating a compensated pixel level from the output pixel level and the output pixel location;

e. a screening unit for calculating a screened pixel level and a screened pixel location from the compensated pixel level, the output pixel location, and a selected screening pattern; and f. wherein the print engine applies an amount of the toner corresponding to the screened pixel level and the non-uniformity to the receiver at a toner location corresponding to the screened pixel location to compensate for the non-uniformity.

An advantage of this invention is that it separates tone-reproduction curves from compensation data, permitting more accurate measurement of both, and increasing the flexibility of the system. For example, the compensation is independent of the type of image source (e.g. scanner vs. camera). The invention provides the capability to compensate for variations finer than the 8-bit granularity of standard printing systems. It can provide different levels of compensation for different regions of the tonescale. It can employ multi-level halftoning (multitoning) to provide improved image quality. Different screening patterns can be compensated differently.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
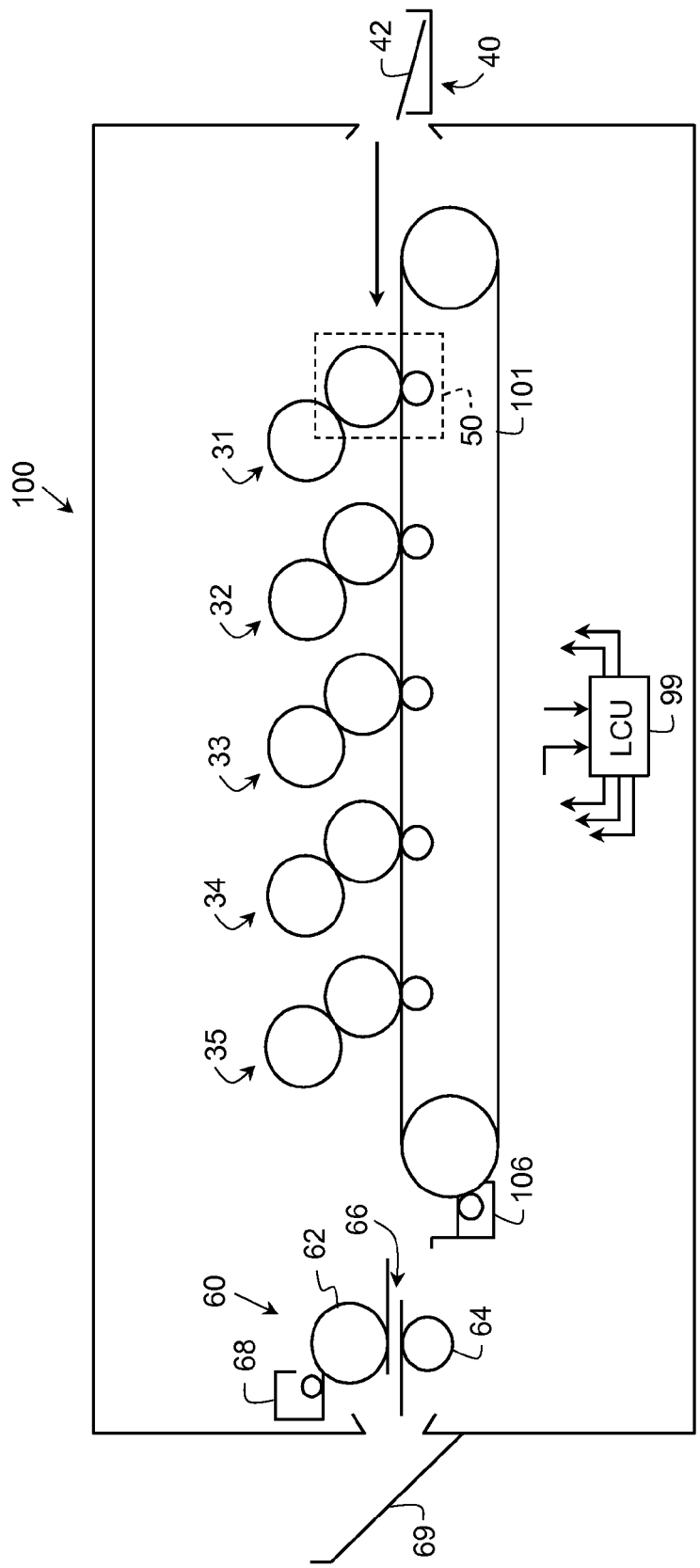
FIG. 1 is an elevational cross-section of an electrophotographic reproduction apparatus suitable for use with this invention.

The attached drawings are for purposes of illustration and are not necessarily to scale.

DETAILED DESCRIPTION OF THE INVENTION

As used herein, the terms "parallel" and "perpendicular" have a tolerance of ±10°.

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein, are selected from such systems, algorithms, components, and elements known in the art. Given the system as described according to the invention in the following, software not specifically shown, suggested, or described herein that is useful for implementation of the invention is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The electrophotographic process can be embodied in devices including printers, copiers, scanners, and facsimiles, and analog or digital devices, all of which are referred to herein as "printers." Various aspects of the present invention are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce original pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, paper type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with the present invention, e.g. the NEXPRESS 2100 printer manufactured by Eastman Kodak Company of Rochester, N.Y., color-toner print images are made sequentially in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for the transfer to the receiver of individual print images. Of course, in other electrophotographic printers, each print image is directly transferred to a receiver.

Electrophotographic printers having the capability to also deposit clear toner using an additional imaging module are also known. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
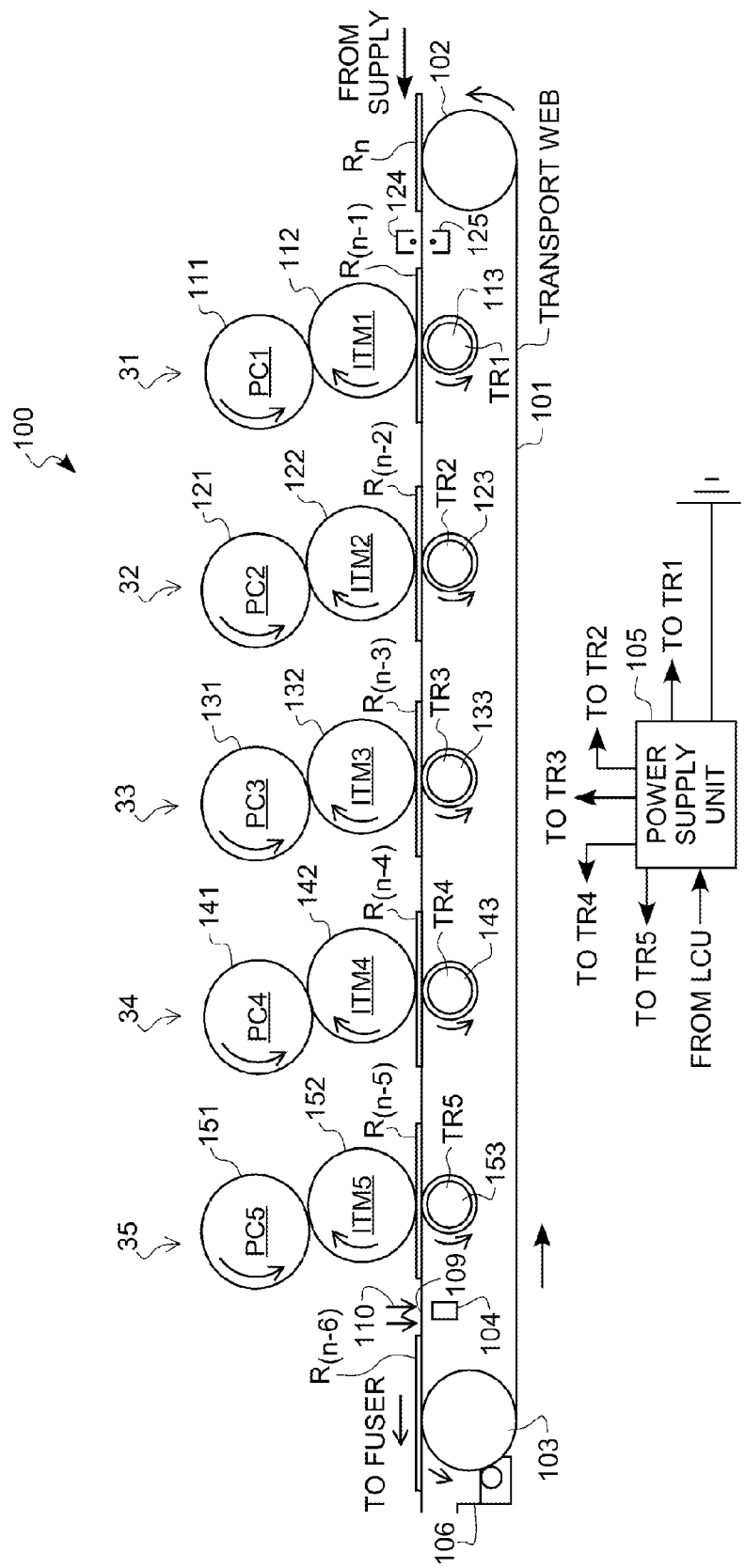
FIG. 2 is an elevational cross-section of the reprographic image-producing portion of the apparatus of FIG. 1.
Figure 3:
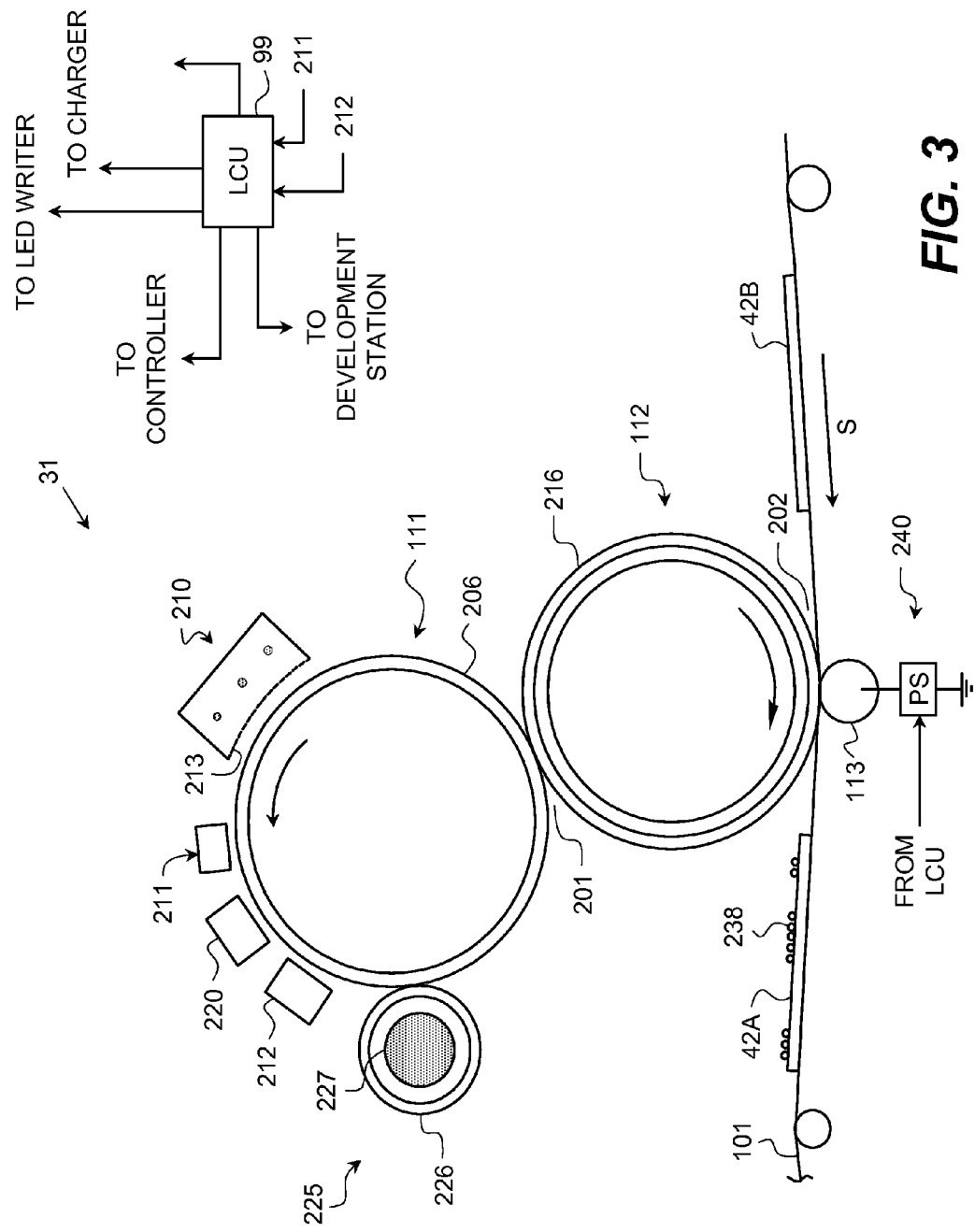
FIG. 3 is an elevational cross-section of one printing module of the apparatus of FIG. 1.

FIGS. 1-3 are elevational cross-sections showing portions of a typical electrophotographic printer 100 useful with the present invention. Printer 100 is adapted to produce images, such as single-color (monochrome), CMYK, or pentachrome (five-color) images, on a receiver (multicolor images are also known as "multi-component" images). Images can include text, graphics, photos, and other types of visual content. One embodiment of the invention involves printing using an electrophotographic print engine having five sets of single-color image-producing or -printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, also known as electrophotographic imaging subsystems. Each printing module produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver, or from an imaging roller to one or more transfer roller(s) or belt(s) in sequence in transfer subsystem 50, and thence to a receiver. The receiver is, for example, a selected section of a web of, or a cut sheet of, planar media such as paper or transparency film.

Each receiver, during a single pass through the five modules, can have transferred in registration thereto up to five single-color toner images to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an embodiment, printing module 31 forms black (K) print images, 32 forms yellow (Y) print images, 33 forms magenta (M) print images, and 34 forms cyan (C) print images.

Printing module 35 can form a red, blue, green, or other fifth print image, including an image formed from a clear toner (i.e. one lacking pigment). The four subtractive primary colors, cyan, magenta, yellow, and black, can be combined in various combinations of subsets thereof to form a representative spectrum of colors. The color gamut or range of a printer is dependent upon the materials used and process used for forming the colors. The fifth color can therefore be added to improve the color gamut. In addition to adding to the color gamut, the fifth color can also be a specialty color toner or spot color, such as for making proprietary logos or colors that cannot be processed as a combination of CMYK colors (e.g. metallic, fluorescent, or pearlescent colors), or a clear toner for image protective purposes or other uses.

Subsequent to transfer of the respective print images, overlaid in registration, one from each of the respective printing modules 31, 32, 33, 34, 35, the receiver is advanced to a fuser 60, i.e. a fusing or fixing assembly, to fuse the print image to the receiver. Transport web 101 transports the print-image-carrying receivers to fuser 60, which fixes the toner particles to the respective receivers by the application of heat and pressure. The receivers are serially de-tacked from transport web 101 to permit them to feed cleanly into fuser 60. Transport web 101 is then reconditioned for reuse at cleaning station 106 by cleaning and neutralizing the charges on the opposed surfaces of the transport web 101.

Fuser 60 includes a heated fusing roller 62 and an opposing pressure roller 64 that form a fusing nip 66 therebetween. Fuser 60 also includes a release fluid application substation 68 that applies release fluid, e.g. silicone oil, to fusing roller 62. Other embodiments of fusers, both contact and non-contact, can be employed with the present invention. For example, solvent fixing uses solvents to soften the toner particles so they bond with the receiver. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver.

The receivers carrying the fused image are transported in a series from the fuser 60 along a path either to a remote output tray 69, or back to printing modules 31 et seq. to create an image on the backside of the receiver, i.e. to form a duplex print. Receivers can also be transported to any suitable output accessory. For example, an auxiliary fuser or glossing assembly can provide a clear-toner overcoat. Printer 100 can also include multiple fusers 60 to support applications such as overprinting, as known in the art.

Printer 100 includes a main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for imaging substrates. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R) respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Further details regarding printer 100 are provided in U.S. Pat. No. 6,608,641, issued on Aug. 19, 2003, by Peter S. Alexandrovich et al., and in U.S. Publication No. 2006/0133870, published on Jun. 22, 2006, by Yee S. Ng et al., the disclosures of which are incorporated herein by reference.

Referring to FIG. 2, receivers $R_n$-$R_{(n-6)}$ are delivered from supply unit 40 (FIG. 1) and transported through the printing modules 31, 32, 33, 34, 35. The receivers are adhered (e.g., electrostatically using coupled corona tack-down chargers 124, 125) to an endless transport web 101 entrained and driven about rollers 102, 103. Each of the printing modules 31, 32, 33, 34, 35 includes a respective imaging member (111, 121, 131, 141, 151), e.g. a roller or belt, an intermediate transfer member (112, 122, 132, 142, 152), e.g. a blanket roller, and transfer backup member (113, 123, 133, 143, 153), e.g. a roller, belt, or rod. Thus, in printing module 31, a print image (e.g. a black separation image) is created on imaging member PC1 (111), transferred to intermediate transfer member ITM1 (112), and transferred again to receiver $R_{(n-1)}$ moving through transfer subsystem 50 (FIG. 1) that includes transfer member ITM1 (112) forming a pressure nip with a transfer backup member TR1 (113). Similarly, printing modules 32, 33, 34, and 35 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). The direction of transport of the receivers is the slow-scan direction (S, FIG. 3); the perpendicular direction, parallel to the axes of the intermediate transfer members (112, 122, 132, 142, 152), is the fast-scan direction.

A receiver, $R_n$, arriving from supply unit 40, is shown passing over roller 102 for subsequent entry into the transfer subsystem 50 (FIG. 1) of the first printing module, 31, in which the preceding receiver $R_{(n-1)}$ is shown. Similarly, receivers $R_{(n-2)}$, $R_{(n-3)}$, $R_{(n-4)}$, and $R_{(n-5)}$ are shown moving respectively through the transfer subsystems (for clarity, not labeled) of printing modules 32, 33, 34, and 35. An unfused print image formed on receiver $R_{(n-6)}$ is moving as shown towards fuser 60 (FIG. 1).

A power supply 105 provides individual transfer currents to the transfer backup members 113, 123, 133, 143, and 153. LCU 99 (FIG. 1) provides timing and control signals to the components of printer 100 in response to signals from sensors in printer 100 to control the components and process control parameters of the printer 100. A cleaning station 106 for transport web 101 permits continued reuse of transport web 101. A densitometer array includes a transmission densitometer 104 using a light beam 110. The densitometer array measures optical densities of five toner control patches transferred to an interframe area 109 located on transport web 101, such that one or more signals are transmitted from the densitometer array to a computer with corresponding signals sent from the computer to power supply 105. Densitometer 104 is preferably located between printing module 35 and roller 103. Reflection densitometers, and more or fewer test patches, can also be used.

FIG. 3 shows more details of printing module 31, which is representative of printing modules 32, 33, 34, and 35. Primary charging subsystem 210 uniformly electrostatically charges photoreceptor 206 of imaging member 111, shown in the form of an imaging cylinder. Charging subsystem 210 includes a grid 213 having a selected voltage. Additional necessary components provided for control can be assembled about the various process elements of the respective printing modules. Meter 211 measures the uniform electrostatic charge provided by charging subsystem 210, and meter 212 measures the post-exposure surface potential within a patch area of a latent image formed from time to time in a non-image area on photoreceptor 206. Other meters and components can be included.

LCU 99 sends control signals to charging subsystem 210, the exposure subsystem 220 (e.g. laser or LED writers), and the respective development station 225 of each printing module 31, 32, 33, 34, 35, among other components. Each printing module can also have its own respective controller (not shown) coupled to LCU 99.

Imaging member 111 includes photoreceptor 206. Photoreceptor 206 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors can also contain multiple layers.

An exposure subsystem 220 is provided for image-wise modulating the uniform electrostatic charge on photoreceptor 206 by exposing photoreceptor 206 to electromagnetic radiation to form a latent electrostatic image (e.g. of a separation corresponding to the color of toner deposited at this printing module). The uniformly-charged photoreceptor 206 is typically exposed to actinic radiation provided by selectively activating particular light sources in an LED array or a laser device outputting light directed at photoreceptor 206. In embodiments using laser devices, a rotating polygon (not shown) is used to scan one or more laser beam(s) across the photoreceptor in the fast-scan direction. One dot site is exposed at a time, and the intensity or duty cycle of the laser beam is varied at each dot site. In embodiments using an LED array, the array can include a plurality of LEDs arranged next to each other in a line, some or all dot sites in one row of dot sites on the photoreceptor can be selectively exposed simultaneously, and the intensity or duty cycle of each LED can be varied within a line exposure time to expose each dot site in the row during that line exposure time.

As used herein, the term "engine pixel" means the smallest addressable unit on photoreceptor 206 or receiver 42 which the light source (e.g. laser or LED) can expose with a selected exposure different from the exposure of another engine pixel. Engine pixels can overlap, e.g. to increase addressability in the slow-scan direction (S). Each engine pixel has a corresponding engine pixel location, and the exposure applied to the engine pixel location is described by an engine pixel level.

The exposure subsystem 220 can be a write-white or write-black system. In a write-white or charged-area-development (CAD) system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or discharged-area development (DAD) system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

A development station 225 includes toning shell 226, which can be rotating or stationary, to apply toner of a selected color to the latent image on photoreceptor 206 to produce a visible image on photoreceptor 206. Development station 225 is electrically biased by a suitable respective voltage to develop the respective latent image, which voltage can be supplied by a power supply (not shown). Developer is provided to toning shell 226 by a supply system (not shown), e.g. a supply roller, auger, or belt. Toner is transferred by electrostatic forces from development station 225 to photoreceptor 206.

In an embodiment, development station 225 employs a two-component developer that includes toner particles and magnetic carrier particles. Development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets disposed around the circumference of magnetic core 227. Magnetic core 227 preferably provides a magnetic field of varying magnitude and direction around the outer circumference of toning shell 226. Further details of magnetic core 227 can be found in U.S. Pat. No. 7,120,379 to Eck et al., issued Oct. 10, 2006, the disclosure of which is incorporated herein by reference. Development station 225 can also employ a mono-component developer comprising toner, either magnetic or non-magnetic, without separate magnetic carrier particles.

Transfer subsystem 50 (FIG. 1) includes transfer backup member 113, and intermediate transfer member 112 for transferring the respective print image from photoreceptor 206 of imaging member 111 through a first transfer nip 201 to surface 216 of intermediate transfer member 112, and thence to a receiver (e.g. 42B) which receives the respective toned print images 238 from each printing module in superposition to form a composite image thereon. Print image 238 is e.g. a separation of one color, such as cyan. Receivers are transported by transport web 101. Transfer to a receiver is effected by an electrical field provided to transfer backup member 113 by power source 240, which is controlled by LCU 99. Receivers can be any objects or surfaces onto which toner can be transferred from imaging member 111 by application of the electric field. In this example, receiver 42B is shown prior to entry into second transfer nip 202, and receiver 42A is shown subsequent to transfer of the print image 238 onto receiver 42A.

Figure 4:
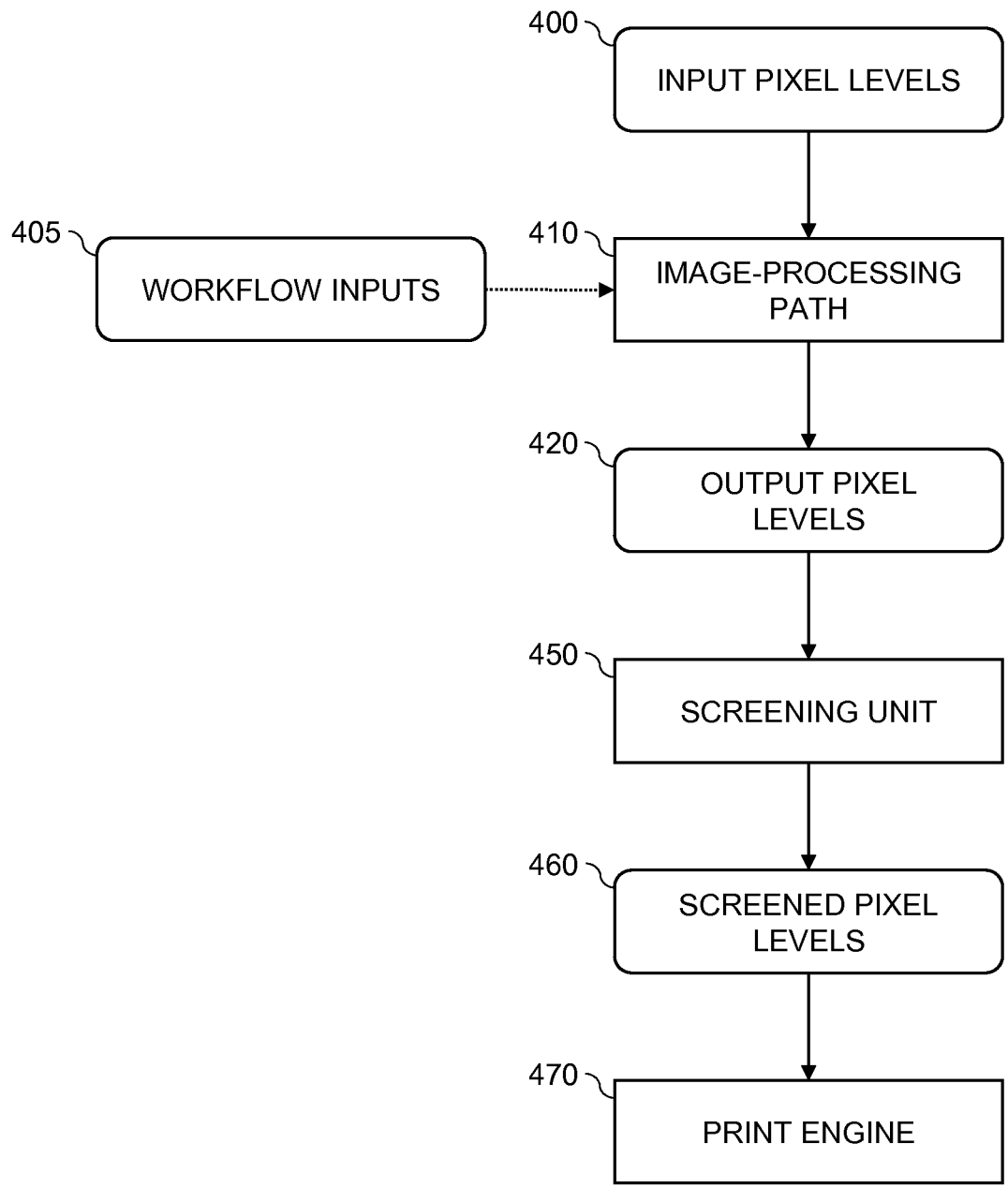
FIG. 4 is a schematic of a data-processing path useful with the present invention.

FIG. 4 shows a data-processing path useful with the present invention, and defines several terms used herein. Printer 100 (FIG. 1) or corresponding electronics (e.g. the DFE or RIP), described herein, operate this datapath to produce image data corresponding to exposure to be applied to a photoreceptor 206 of imaging member 111 (FIG. 3), as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 400. These can be any level known in the art, e.g. sRGB code values (0 . . . 255) for red, green, and blue (R, G, B) color channels. There is one pixel level for each color channel. Input pixel levels 400 can be in an additive or subtractive space. Image-processing path 410 converts input pixel levels 400 to output pixel levels 420, which can be cyan, magenta, yellow (CMY); cyan, magenta, yellow, black (CMYK); or values in another subtractive color space. Output pixel level 420 can be linear or non-linear with respect to exposure, $L^*$, or other factors known in the art.

Image-processing path 410 transforms input pixel levels 400 of input color channels (e.g. R) in an input color space (e.g. sRGB) to output pixel levels 420 of output color channels (e.g. C) in an output color space (e.g. CMYK). In various embodiments, image-processing path 410 transforms input pixel levels 400 to desired CIELAB values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 410 can use optional workflow inputs 405, e.g. ICC profiles of the image and the printer 100, to calculate the output pixel levels 420.

Input pixels are associated with an input resolution in pixels per inch (ippi, input pixels per inch), and output pixels with an output resolution (oppi). Image-processing path 410 scales or crops the image, e.g. using bicubic interpolation, to change resolutions when ippi≠oppi. The following steps in the path (output pixel levels 420, screened pixel levels 460) are preferably also performed at oppi, but each can be a different resolution, with suitable scaling or cropping operations between them.

Screening unit 450 calculates screened pixel levels 460 from output pixel levels 420. Screening unit 450 can perform continuous-tone (processing), halftone, multitone, or multilevel halftone processing, and can include a screening memory or dither bitmaps. Screened pixel levels 460 are at the bit depth required by print engine 470.

Print engine 470 represents the subsystems in printer 100 that apply an amount of toner corresponding to the screened pixel levels to a receiver 42 (FIG. 1) at the respective screened pixel locations. Examples of these subsystems are described above with reference to FIGS. 1-3. The screened pixel levels and locations can be the engine pixel levels and locations, or additional processing can be performed to transform the screened pixel levels and locations into the engine pixel levels and locations.

Figure 5:
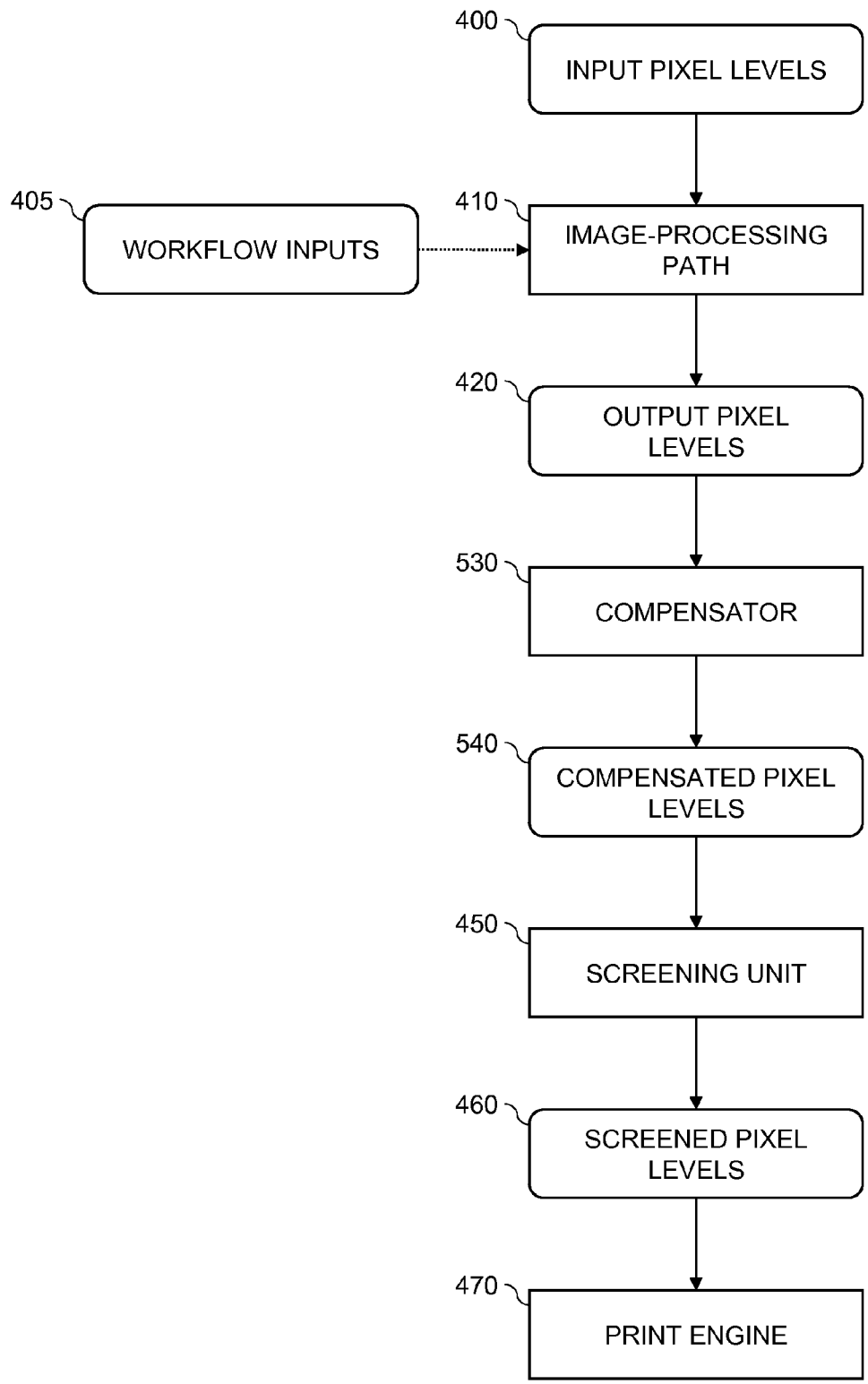
FIG. 5 is a schematic of a data-processing path according to an embodiment of the present invention.

FIG. 5 shows a schematic of a data-processing path according to an embodiment of the present invention. Input pixel levels 400, workflow inputs 405, image-processing path 410 and output pixel levels 420 are as described above with reference to FIG. 4. Compensator 530 receives output pixel levels 420 and produces compensated pixel levels 540, as will be described in more detail below. Screening unit 450 is as described above except that it receives compensated pixel levels 540 instead of output pixel levels 420. Screened pixel levels 460 and print engine 470 are as described above.

Figure 6:
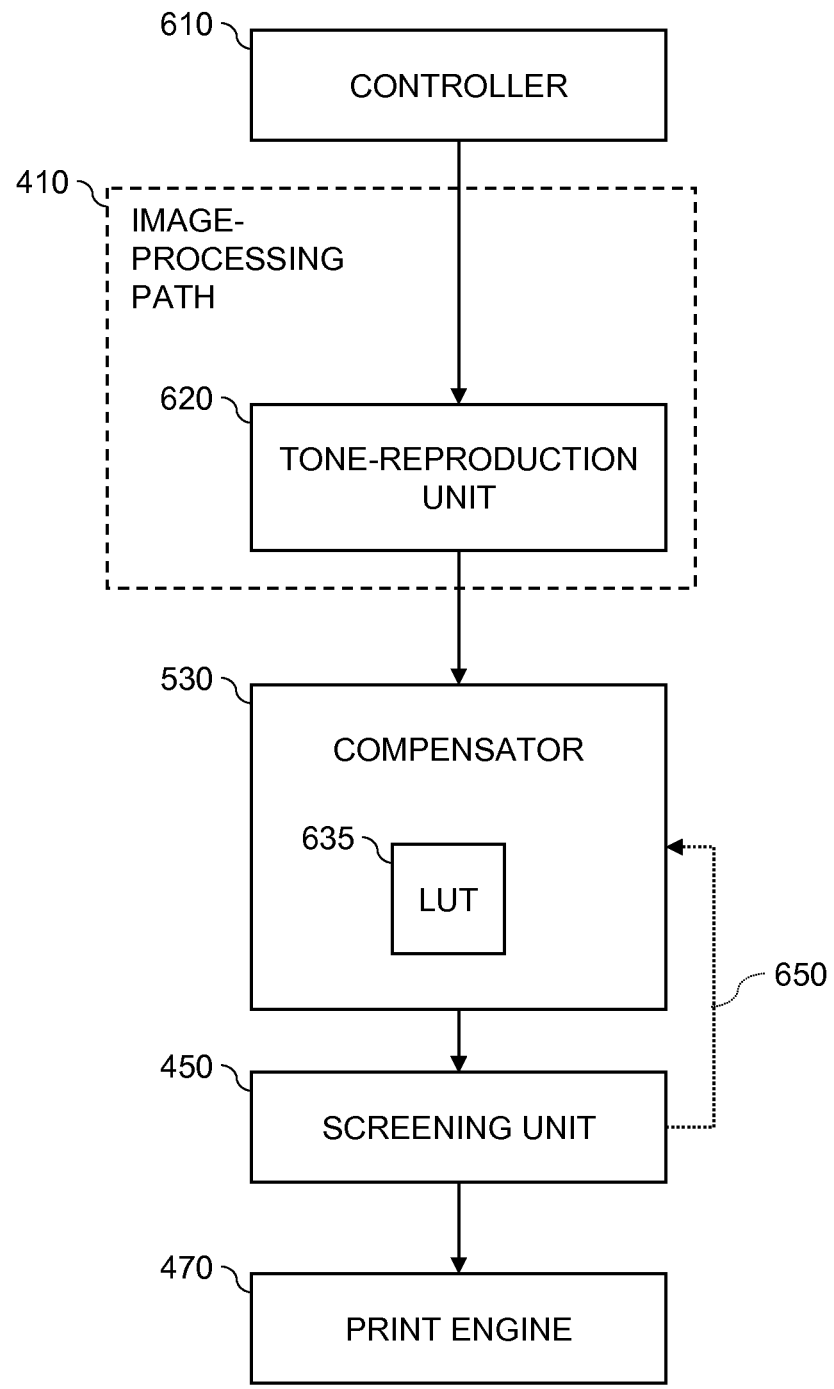
FIG. 6 is a block diagram of an embodiment of the present invention.

FIG. 6 is a block diagram of a screened hardcopy reproduction apparatus according to an embodiment of the present invention. The apparatus applies toner (e.g. to form print image 238 of FIG. 3) to a receiver 42 (FIG. 1) Print engine 470 is described herein with reference to FIGS. 1-3, and applies the toner to the receiver. However, the print engine may not apply toner uniformly, with the result that the toner applied to the receiver may have a non-uniformity. For example, in an area on the receiver which should have a uniform optical density (thus a uniform toner laydown in the halftone field), the print engine may apply more or less toner than desired in a certain area in the fast-scan direction, resulting in a streak extending in the slow-scan direction. Other examples of non-uniformities are discussed below with reference to FIGS. 10A-F.

Controller 610 receives an input pixel level 400 (FIG. 5) and a corresponding input pixel location. Controller 610 can be implemented in the LCU 99 (FIG. 1) of printer 100 or a separate DFE, as described herein.

Tone-reproduction unit 620, which is part of image-processing path 410, calculates an output pixel level 420 (FIG. 5) from the input pixel level 400, and a corresponding output pixel location from the input pixel location, as described above. Tone-reproduction unit 620 can include a tone reproduction curve (TRC) for compensating for non-linearities of print engine 470.

Compensator 530 calculates a compensated pixel level 540 (FIG. 5) from the output pixel level 420 and the corresponding output pixel location. Screening unit 450 calculates a screened pixel level 460 and a corresponding screened pixel location from the compensated pixel level 540, the output pixel location, and a selected screening pattern. The screening pattern can define dot shapes, dot sizes, engine pixel sizes, and other features useful in calculating the screened pixel levels 460. Compensator 530 and screening unit 450 are described further below with reference to FIG. 7. In an embodiment, compensator 530 includes a LUT 635 (look-up table), as described further below with reference to FIG. 7.

Placing compensator 530 in the datapath after tone-reproduction unit 620 advantageously separates tone-reproduction curves from compensation data, permitting more accurate measurement of both, and increasing the flexibility of the system. For example, the compensation can be independent of the type of image source (e.g. scanner vs. camera), as any correction for differences in source colorimetry can be performed in tone-reproduction unit 620 (e.g. image-processing path 410, FIG. 4).

Print engine 470 applies an amount of the toner corresponding to the screened pixel level 460 and the non-uniformity to the receiver 42 at a toner location corresponding to the screened pixel location to compensate for the non-uniformity. For example, if the non-uniformity is a streak that is consistently lighter (less dense) than its surround, the screened pixel levels 460 will cause print engine 470 to apply more toner in the area of the streak than elsewhere on the surface of receiver 42. Print engine 470 can be implemented using printing module 31 (FIG. 1) or other electrophotographic engines, as described herein.

Referring back to FIG. 3, in one embodiment, print engine 470 includes an imaging roller 111 having a photoreceptor 206. Print engine 470 includes charging subsystem 210 for electrostatically charging photoreceptor 206. Exposure subsystem 220 image-wise modulates the charge on photoreceptor 206 to form a latent image. Development station 225 is electrically biased to cause the toner to be attracted to the latent image to develop the latent image into a visible image on photoreceptor 206. Transfer subsystem 50 (FIG. 1) transfers the toner from the photoreceptor to the receiver to form a print image 238 on the receiver 42B. Receiver 42B receives the toner from photoreceptor 206. Fuser 60 causes the toner of print image 238 to adhere to receiver 42B, as described above.

In another embodiment, receiver 42B is a planar medium, and toner is applied from photoreceptor 206 directly to receiver 42B instead of to intermediate transfer member 112.

In an embodiment, non-uniformity correction is applied only in a correctable dimension, and not in a non-correctable dimension. For example, the correctable dimension is the fast-scan direction, and the non-correctable dimension is the slow-scan direction. In another embodiment, LUT 635 stores correction data for a plurality of banks. Each bank represents correction data for a particular spatial extent in the correctable dimension, or for a particular range of output pixel levels 420 (FIG. 4). This advantageously reduces the amount of high-speed storage required for LUT 635.

In an embodiment, each bank represents correction data for a particular range of output pixel levels 420, and each bank has a different spacing between adjacent elements. Spacing can be measured in luminance, CIELAB L*, printed density, or related metrics.

In one embodiment, banks representing shadow detail have more closely-spaced elements than banks representing highlight detail, since the human visual system can be more sensitive to small changes in luminance at low absolute luminance levels than at high levels, provided the average retinal illuminance when the low luminance level is viewed is comparable to the average retinal illuminance when the high absolute luminance level is viewed. In another embodiment, banks representing highlight detail have more closely-spaced elements than banks representing shadow detail, since the human visual system can be more sensitive to small changes in luminance at higher retinal illuminance levels than at lower retinal illuminance levels. In this way different accuracies of compensation can be provided for different regions of the tonescale.

Different levels of compensation can also be provided for different regions of the tonescale. For example, if the minimum reproducible step between two adjacent densities is larger in a first region of the tonescale than a second region, error-diffusion techniques known in the art can be used in the first region to reduce the visibility of density changes due to compensation. However, those techniques are not applied in the second region, so that visible noise (instead of density changes) is reduced in the second region.

Different screening patterns can be compensated differently. In an embodiment, feedback path 650 (FIG. 6) carries information about the current screening pattern from screening unit 450 back to compensator 530. Compensator 530 applies a different level, accuracy, or type of compensation based on the screening information. Different screen patterns will cause different streak signatures. Therefore streaks are typically screen-dependent. For example, when the screen is a line screen (FIG. 8, dot shape 810) having a screen angle near 90°, vertical streaks can interact in a particularly noticeable way with the screening pattern. Compensator 530 therefore applies more accurate compensation, and optionally error-diffusion techniques, to this screen than to a line screen at an angle near 0°.

Figure 9:
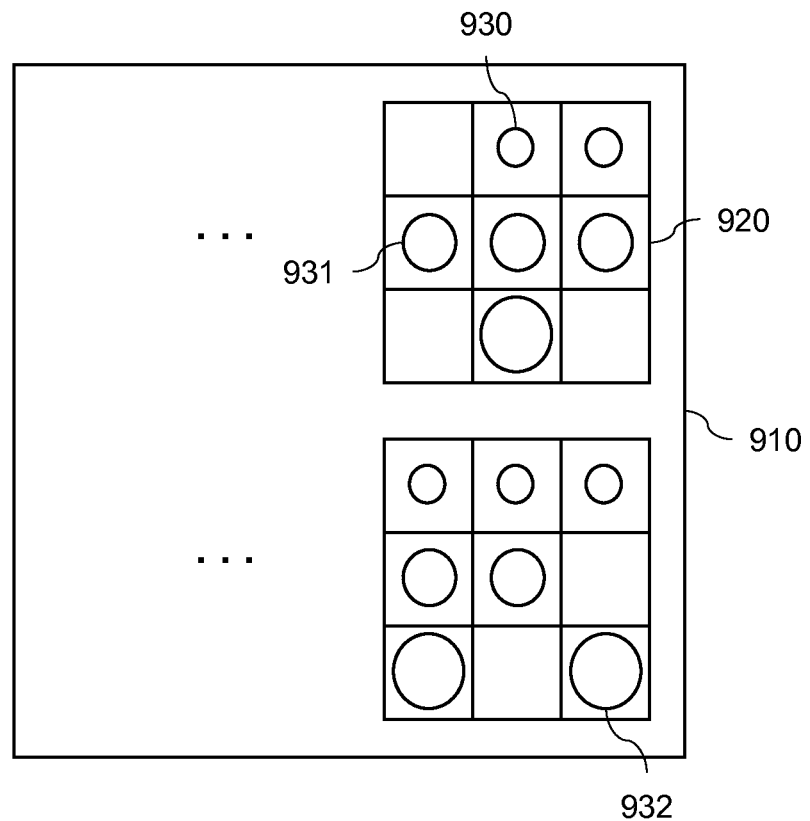
FIG. 9 shows a representative screening pattern and representative engine pixel sizes according to an embodiment of the present invention.

Referring to FIG. 9, there is shown an example layout of a screening pattern. An image is divided into one or more tiles 910, each containing one or more screen cells 920, each containing one or more engine pixels 930. Each tile 910 is a group of cells which together form a rectangle, and the rectangles of all tiles 910 pack together to tile the plane of the image. The leading edge of each tile 910, as the receiver moves through printer 100, is parallel to the fast-scan axis of printer 100.

Each screen cell 920 is an area of the image in which one halftone dot can be formed, or an area which packs together with adjacent screen cells 920 to define the area in which one dot can be formed. Each cell 920 is a group of engine pixels 930.

Each engine pixel 930 corresponds to an area in which a selected exposure is applied to photoreceptor 206 (FIG. 3) by exposure subsystem 220 (FIG. 3). In various embodiments, for laser writers, one engine pixel 930 is a discrete site at which a desired laser intensity is directed; for LED writers, one engine pixel 930 is the area on which light from one LED falls during a period of time in which photoreceptor 206 moves less than a selected distance in the slow-scan direction. For example, the slow-scan direction is divided into a plurality of exposure lines, and one engine pixel is the area exposed by an LED while the photoreceptor moves one exposure line, or ½ exposure line, or a selected amount less than or equal to one exposure line. Although some of the light intended for a selected engine pixel can provide some exposure to adjacent pixels, each engine pixel 930 is logically distinct from all others, and can be treated independently of all others by the image-processing path.

In conventional binary halftoning systems, each engine pixel 930 is either exposed with a fixed exposure or not exposed at all. In multi-toning or multi-level halftoning systems, each engine pixel 930 can be exposed at any of at least 3 levels, including no exposure, full exposure, and at least one intermediate level of exposure. Different exposure levels of the engine pixels 930 can result in different sizes of the toner area of the developed image on the photoreceptor. This effect is shown by different sizes of engine pixels 930. In this example, each engine pixel can be unexposed, or can be exposed at any of three different engine-pixel levels, as shown by engine pixels 930, 931 and 932 (small, medium, and large, respectively).

In an embodiment, screened pixel levels 460 (FIG. 7) have a screened-level bit depth greater than one bit, and the selected screening pattern in screen memory 740 (FIG. 7) includes at least three different engine pixel levels (e.g. corresponding to engine pixels 930, 931, 932). In another embodiment, engine pixel levels provided to print engine 470 (FIG. 7) have an engine-level bit depth greater than one bit, and the selected screening pattern in screen memory 740 includes at least three different engine pixel levels (e.g. corresponding to engine pixels 930, 931, 932).

Figure 7:
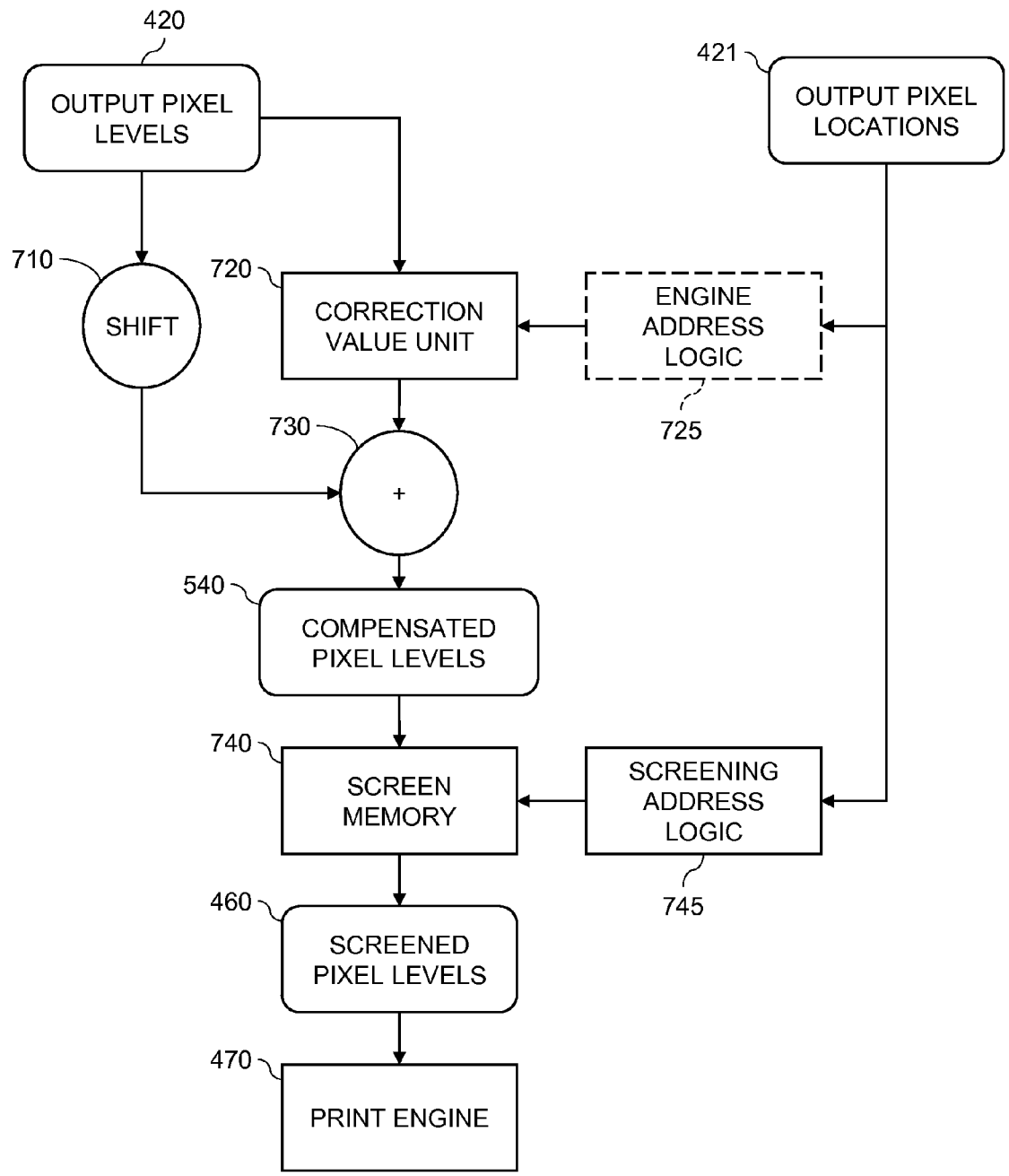
FIG. 7 is a block diagram of a compensator according to an embodiment of the present invention.

Referring to FIG. 7, and also to FIG. 6, there is shown a block diagram of a compensator 530 and screening unit 450 according to an embodiment of the present invention. Output pixel levels 420 and corresponding output pixel locations 421 are received from the tone-reproduction unit 620. The output pixel levels 420 are provided to a correction value unit 720, which can be implemented as a function, or as a 2-D or 3-D lookup table (e.g. LUT 635), as discussed below.

Optional engine address logic 725 calculates the position of the output pixel with respect to the print engine 470. If engine address logic 725 is not used, output pixel location 421 is provided directly to correction value unit 720. Compensation can be applied to the whole printable area of receiver 42, or to only part of receiver 42, and different compensation levels or schemes can be applied to different parts of receiver 42.

For example, many non-uniformities, e.g. vertical streaks, depend only on the position of a pixel in the fast-scan direction. In one embodiment, engine address logic 725 transforms output pixel location 421 to provide, or extracts from output pixel location 421, only the position in the fast-scan direction of the output pixel in question. For output pixel locations 421 expressed as (x,y), where x is the coordinate in the fast-scan direction and y is the coordinate in the slow-scan direction, e.g. in points or mm, engine address logic 725 provides only coordinate x to correction value unit 720. For fast-scan directions not orthogonal to the (x,y) grid, engine address logic 725 rotates (x,y) through an angle θ between the x-axis and the fast-scan direction to produce (x',y'), and provides x' to correction value unit 720.

In an embodiment, correction value unit 720 is implemented as a 2-D LUT (e.g. LUT 635). The LUT is indexed in the first dimension by fast-scan position and preferably by engine pixel number in the fast-scan direction, e.g. by LED number for an LED printhead. The LUT is indexed in the second dimension by output pixel level 420, or by a value calculated from output pixel level 420. In one example, with 8-bit output pixel levels 420, the top four bits are used to index the correction value unit 720. The value in the LUT indexed by the two dimensions is output from correction value unit 720. This embodiment is particularly useful when non-uniformities have a fixed offset from the desired density independent of the desired density. In an embodiment, a 600 dpi, 8192-LED printhead is used, spanning ~13.64". The top four bits of output pixel level are used to index the LUT 635 in correction value unit 720. LUT 635 is an 8192×16×8 bit LUT.

In another embodiment, correction value unit 720 is implemented as a 3-D LUT (e.g. LUT 635). The LUT is indexed in the first dimension by fast-scan position, and in the second dimension by output pixel level 420, or by a value calculated from output pixel level 420, as described above. The LUT is indexed in the third dimension by slow-scan position or a value calculated from the slow-scan position (y) in output pixel location 421. This embodiment is particularly useful for correcting banding and other non-uniformities that vary from row to row.

In another embodiment, correction value unit 720 is implemented as a function. Correction values are calculated in real time for each engine pixel based on stored function parameters or measured parameters calculated from measurements of the current state of the engine or the characteristics of the current print job. In an embodiment, singular value decomposition (SVD) of measured data is used to calculate basis vectors and weights. These basis vectors and weights are used to calculate the correction values.

Correction value unit 720 outputs an offset or gain which is applied by operation 730 to output pixel level 420 to produce compensated pixel level 540. Operation 730 can be addition or subtraction (saturating or non-saturating), multiplication, division, left or right shifting, exponentiation, bitwise AND, OR, or XOR, or other binary operations. Compensated pixel levels 540 and operation 730 preferably form an algebraic group (e.g. there are identity and inverse elements of the set of compensated pixel levels 540 under operation 730). Output pixel level 420 has an output-level bit depth (e.g. 8 bits) and compensated pixel level 540 has a compensated-level bit depth. The compensated-level bit depth can be equal to or less than the output-level bit depth, and is preferably greater than the output-level bit depth.

In various embodiments, the compensated-level bit depth (e.g. 10 bits) is greater than the output-level bit depth (e.g. 8 bits). To accomplish this, shift operation 710 increases the bit depth or range of output pixel level 420, e.g. by shifting output pixel level 420 left one or more bit positions, or multiplying output pixel level 420 by a scaling factor, preferably >1.0. Operation 730 adds the scaled version of output pixel level 420 to the offset from correction value unit 720 to produce compensated pixel level 540.

In one example, output pixel level 420 is eight bits wide. Shift operation 710 shifts output pixel level 420 left by two bits, inserting zeros at the right, i.e. multiplies output pixel level 420 by four. Correction value unit 720 outputs a two-bit offset, and operation 730 combines the two bits of the offset with the two least-significant bits of the shifted output pixel level by a bitwise OR.

In another example, output pixel level 420 is 8 bits wide. Shift operation 710 shifts output pixel level 420 left by one bit. Correction value unit 720 outputs an eight-bit offset. Operation 730 adds the nine-bit shifted output pixel level and the eight-bit offset to produce a 10-bit compensated pixel level 540.

The compensated-level bit depth is preferably greater than the output-level bit depth to account for the 0.25ΔL* (CIELAB) sensitivity reported for some observers (Mizes [NIP19], cited above). Conventional systems use a 0.5ΔL* JND (just-noticeable difference), requiring 201 levels to represent a visually-smooth density ramp (L*=0, 0.5, 1, . . . , 99, 99.5, 100.0). This fits comfortably within the eight bits (i.e. 256 levels) provided for image processing operations in most systems. However, an 8-bit system is incapable of producing visually-smooth ramps for observers with 0.25ΔL* sensitivity (which requires L*=0, 0.25, 0.5, . . . , 99.75, 100, for a total of 401 levels). A compensated-level bit depth of at least nine bits provides at least 512 levels, so smooth ramps can be represented and produced even for 0.25ΔL* observers.

Screen memory 740 is a function or lookup table used to map compensated pixel level 540 to screened pixel level 460. Screen memory 740 can render image data using halftone patterns, multi-level halftones, or other screen types known in the art. In one embodiment, screen memory 740 is a three-dimensional lookup table (3-D LUT) as described below.

Screen memory 740 stores data for a single screen cell or tile, as described above with reference to FIG. 9. Screening address logic 745 produces, for each output pixel location 421, an address relative to the screen cell or tile containing that output pixel location 421. In an embodiment, when each tile contains one screen cell of size (r,c) and output pixel location 421 is (x,y), screening address logic 745 produces (x mod r, y mod c) as the screen-cell-relative address (or tile-relative address).

Screening memory 740 produces a screened pixel level 460 for each combination of screen-cell-relative address and compensated pixel level 540. In an embodiment, screen memory 740 is a 3-D LUT addressed by relative-address row, relative-address column, and compensated pixel level 540. For fractional relative addresses, adjacent values in the screening memory can be combined using weighted interpolation.

Screened pixel levels 460 are provided to print engine 470 to cause corresponding amounts of toner to be applied to receiver 42, as described further above.

Figure 8:
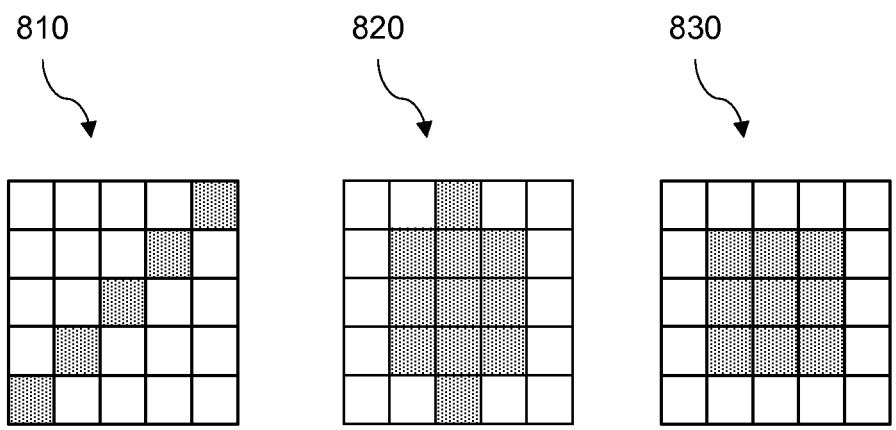
FIG. 8 shows representative dot shapes according to an embodiment of the present invention.

FIG. 8 shows three representative dot shapes according to an embodiment of the present invention: line dot shape 810, elliptical dot shape 820, and square dot shape 830. In an embodiment, the selected screening pattern stored in screen memory 740 (FIG. 7) includes a plurality of different dot shapes, and the screening unit 450 (FIG. 6) selects one of the dot shapes based on the compensated pixel level 540 (FIG. 7). Conventional halftone patterns change dot size, but not shape, with desired optical density. Changing dot shape and size with density (and thus with compensated pixel level 540) provides additional flexibility in compensating for streaks and additional control of the image on the receiver.

Referring to FIGS. 10A-F, one type of non-uniformity is the vertical streak (on a portrait-oriented receiver). As described above, print engine 470 has a fast-scan direction and a slow-scan direction that are preferably perpendicular to each other.

Figure 10A:
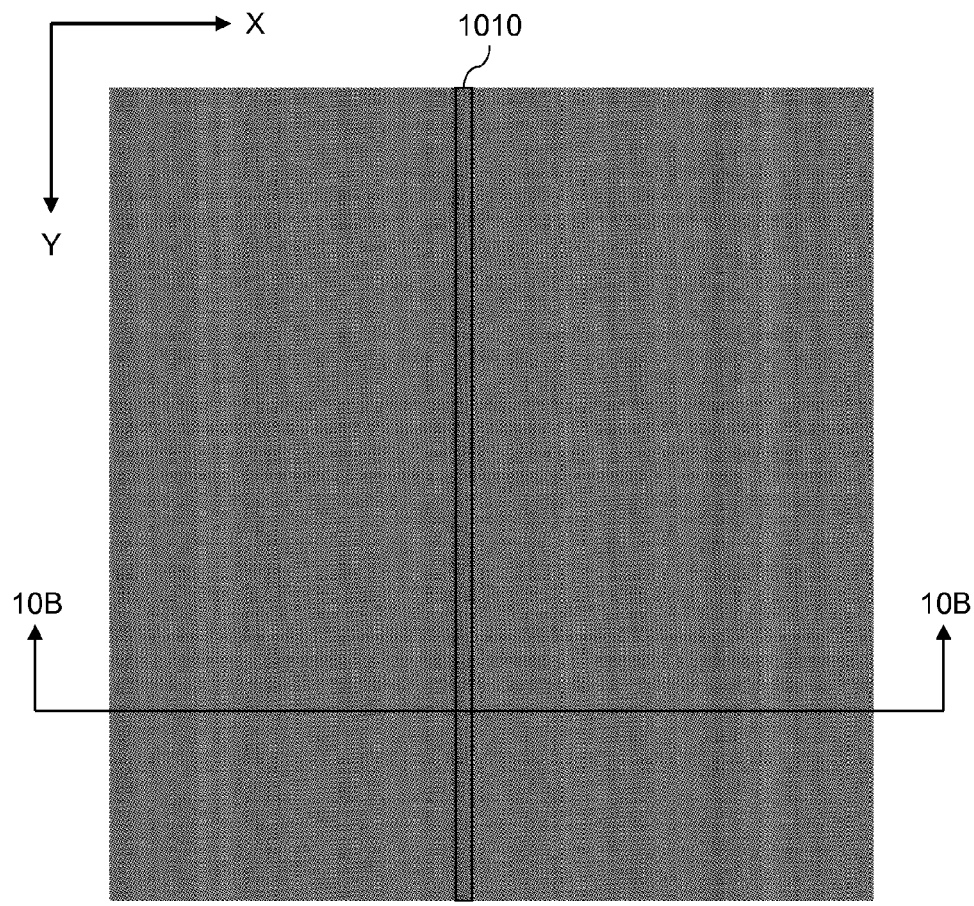
FIG. 10A shows a representative streak pattern.

FIG. 10A shows a representative streak pattern. The streaks extend in the slow-scan direction (Y), and have relatively constant width in the fast-scan direction (X). FIG. 10A was intended to be a uniform gray field, but the streaks are non-uniformities which can be lighter or darker than the desired color. The non-uniformity of print engine 470 has a bounding parallelogram 1010 (here, a rectangle) with sides parallel to the fast-scan (X) and slow-scan (Y) directions, and the sides of bounding parallelogram 1010 are longer in the slow-scan direction than the fast-scan direction. Therefore, the non-uniformity is a vertical streak. Specifically, the print engine applies more or less toner than an amount corresponding to the engine pixel level to a selected area (e.g. bounding parallelogram 1010), whereby the non-uniformity is a streak in the selected area. Streaks can also extend in the fast-scan direction; such streaks are typically referred to as "banding artifacts." Streaks can also extend in other directions on the receiver.

Figure 10B:
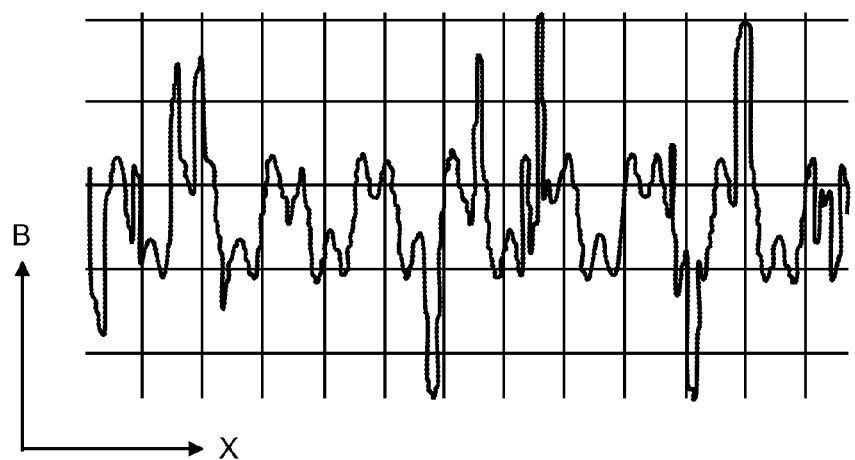
FIG. 10B shows a streak profile taken along a horizontal line in FIG. 10A.

FIG. 10B shows a streak profile taken along a single horizontal line in FIG. 10A. Line 10B-10B is an example of such a line. Lighter streaks are shown with larger values, and darker streaks with smaller, on brightness axis B (a.u.).

Figure 10C:
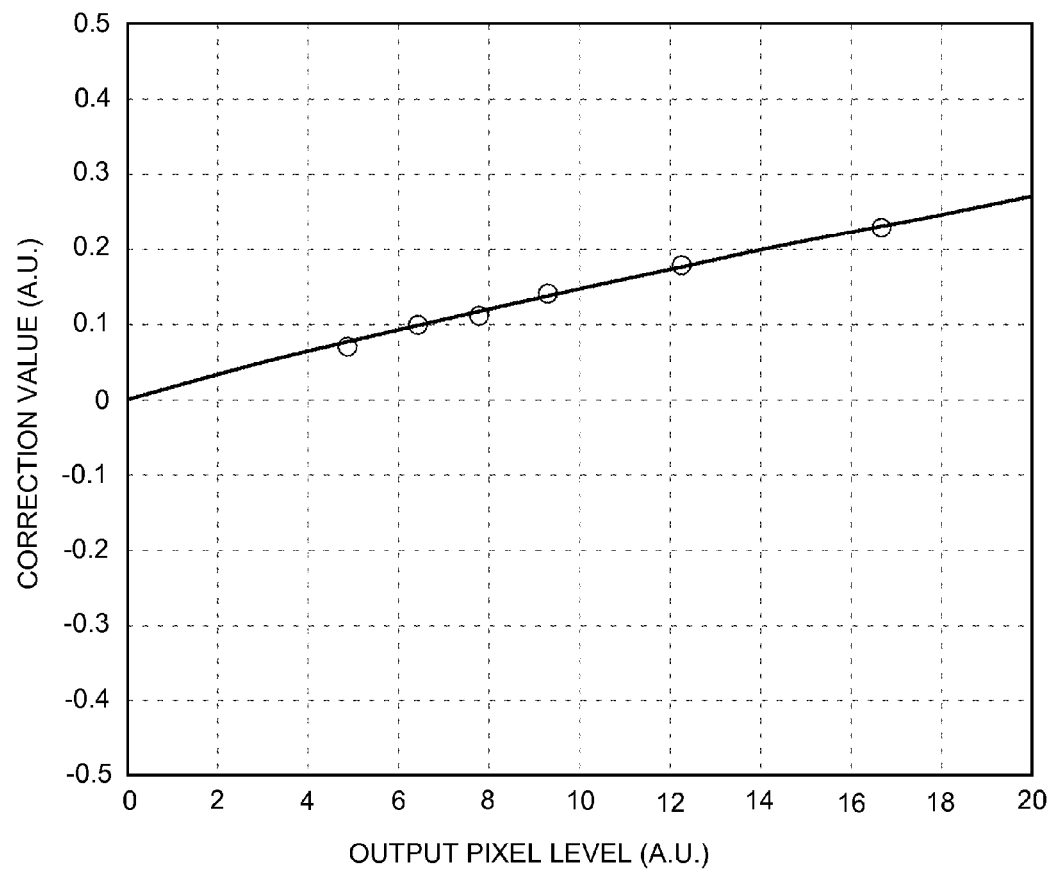
FIG. 10C shows compensation data for a representative streak.
Figure 10D:
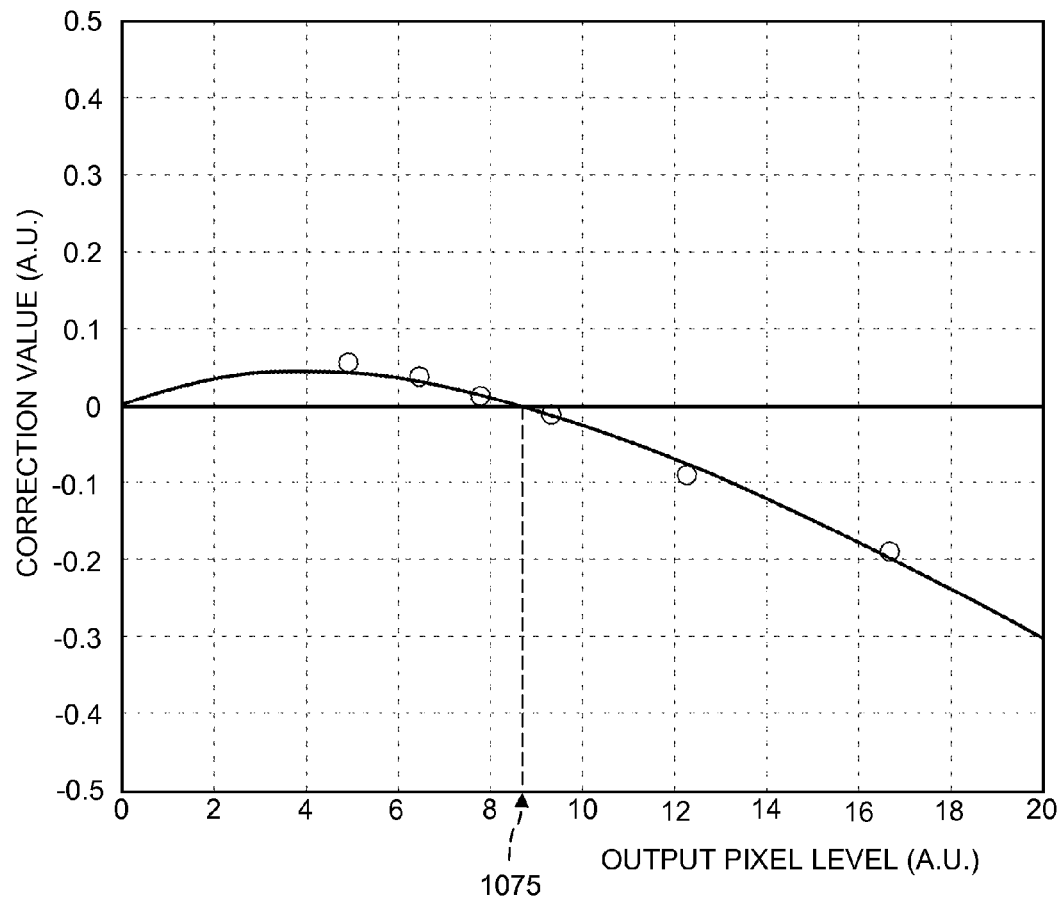
FIG. 10D shows compensation data for another representative streak.

FIGS. 10C and 10D show compensation data for two representative streaks. These data are representative of data that can be stored by correction value unit 720. The abscissas correspond to output pixel level 420. The ordinates represent correction to output pixel level 420 to compensate for non-uniformity, and correspond to the value output by correction value unit 720. Each plot represents data for one column (extending in the Y direction of FIG. 10A) at various output pixel levels 420. Circles are measured points, and lines are fits of the measurements. These data correspond to a DAD (write-black) system. In an embodiment, ordinate values correspond to a positive or negative offset to be added to the abscissa values to compensate for a streak.

FIG. 10C shows compensation data for a representative streak that lightens the print (reduces the exposure). In order to compensate for this streak, exposure is added to darken the print. As the desired density increases across the abscissa, more compensation exposure is added (increasing values on the ordinate). That is, all compensation data values are positive for this type of streak.

FIG. 10D shows compensation data for another representative streak that lightens the print when the desired exposure is below crossover 1075. However, in the same column, the streak darkens the print when the desired exposure is above crossover 1075. In order to compensate for this streak, exposure is added to darken the print when the desired exposure is below crossover 1075, and is subtracted to lighten the print when the desired exposure is above crossover 1075. That is, for this type of streak, compensation data values are positive for lower exposures and negative for higher exposures.

Figure 10E:
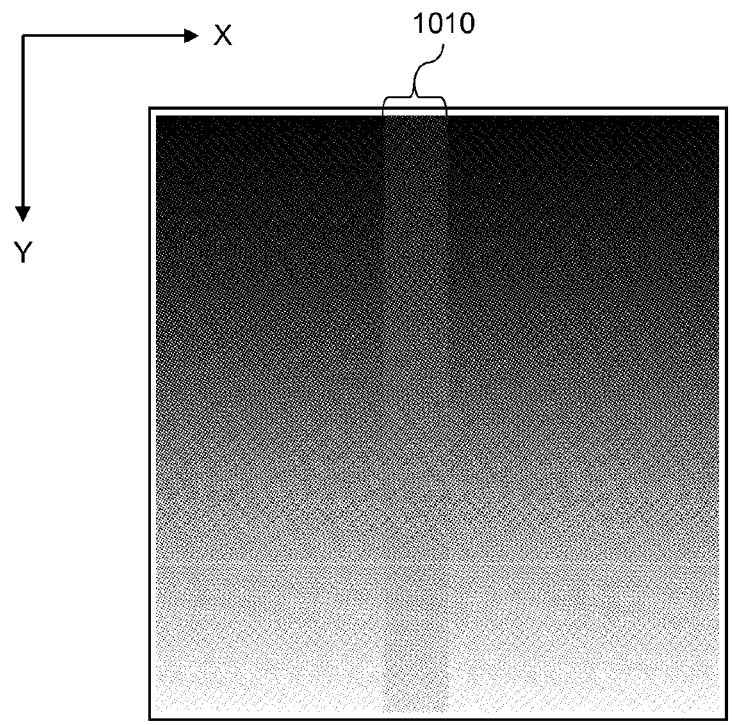
FIG. 10E shows another representative streak pattern.

FIG. 10E shows a representative streak pattern similar to that compensated by the data of FIG. 10D. To permit easier observation of the streak, only the X extent of bounding parallelogram 1010, here a rectangle, is shown. The streak is lighter than its surround when its surround is dark, and darker than its surround when its surround is light. This is the same phenomenon exhibited by the representative streak whose compensation data is shown in FIG. 10D.

Figure 10F:
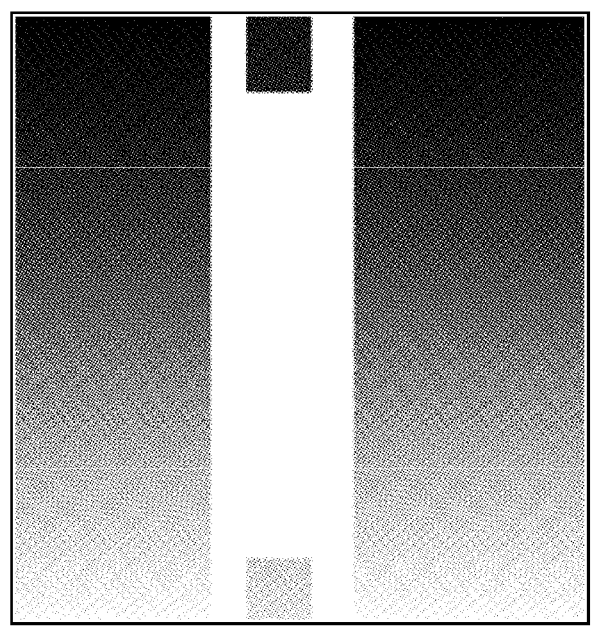
FIG. 10F shows an alternative view of the streak pattern of FIG. 10E.

FIG. 10F shows the same streak pattern as FIG. 10E, but with the center of the streak erased to more clearly show that the streak is darker at the top than at the bottom. This fact can be difficult to see in FIG. 10E due to optical illusions.

Figure 11:
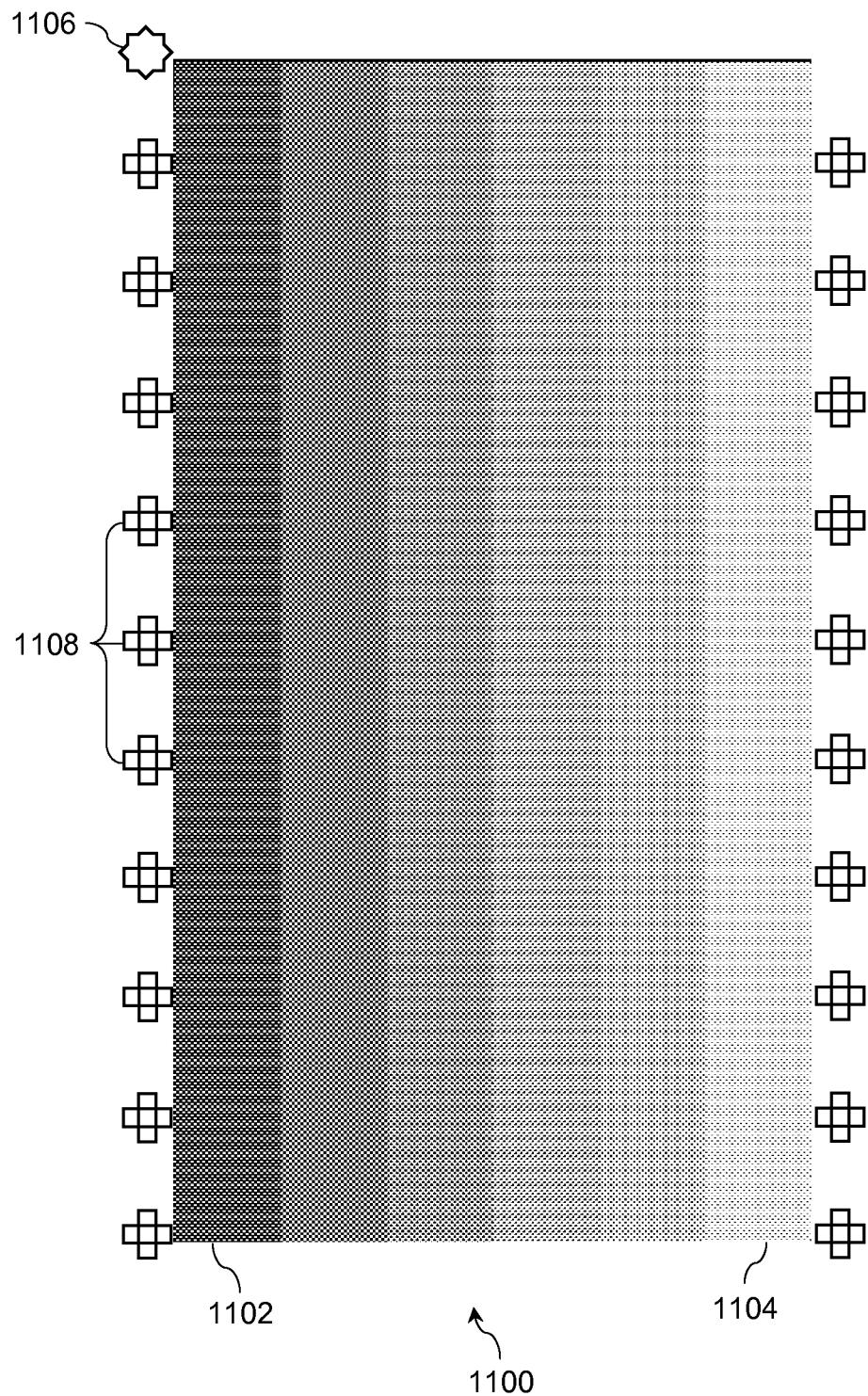
FIG. 11 shows an example of a test target for measuring the response of a printer.

FIG. 11 shows an example of a test target for measuring the response of a printer. Target 1100 includes multiple uniform-density images and two types of alignment marks. The uniform-density images vary in tone from a darker-tone uniform-density image 1102 to a lighter-tone uniform-density image 1104. The densities can be arranged across target 1100 in increasing, decreasing, random, or any other order. Alignment marks 1106, 1108 (shown enlarged for easier visibility) are used to correlate the location of the printed mark to a pixel location from exposure subsystem 220 (FIG. 2). When the exposure device is an LED printhead, the alignment marks are used to locate the exact LED array locations on the printhead.

Before printing target 1100, a relationship between output density and output pixel level for the print engine is determined, as will be described further below with reference to FIG. 12. Moreover, all compensation is set to pass-through before printing target 1100, i.e. correction value unit 720 is set to output the identity value of operation 730 (e.g. 0 for addition, 1 for multiplication). This advantageously causes the measured data to close approximate physically- or psychophysically-meaningful intervals between uniform-density images, and decouples the TRC from compensation. As discussed above with reference to FIG. 6, different accuracies of compensation can be provided for different regions of the tonescale. In an embodiment, the desired densities of the uniform-density images (e.g. 1102, 1104) are selected to correspond to the desired accuracies of compensation. For example, if more accurate compensation is desired in the highlight region, the desired-density difference between adjacent uniform-density images can be smaller for desired densities corresponding to highlights than for desired densities corresponding to shadows.

Figure 12:
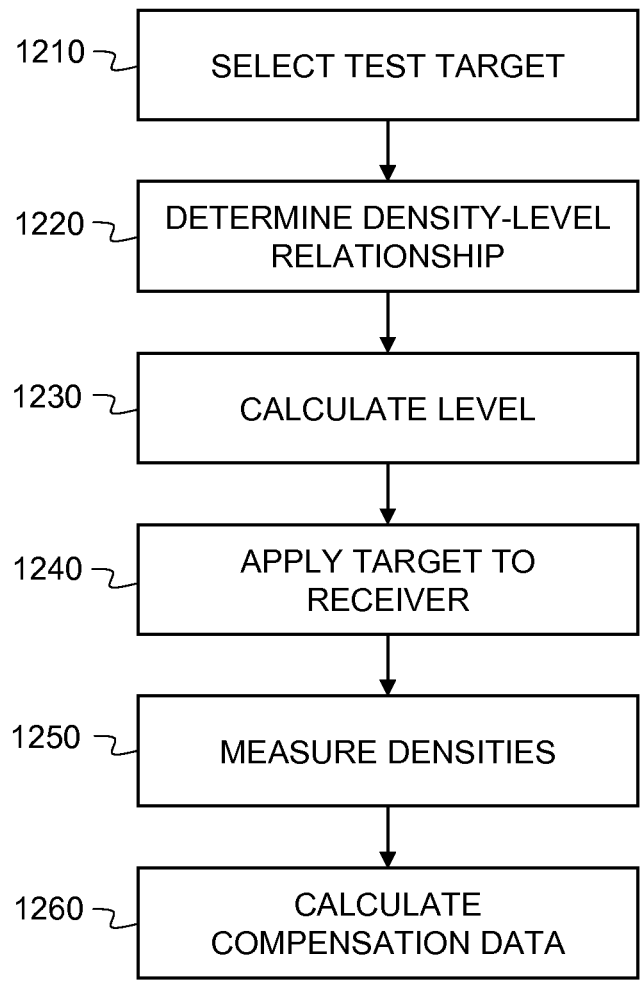
FIG. 12 is a flowchart of a method useful with the present invention.

Referring to FIG. 12 and also to FIG. 11, there is shown a flowchart of a method of calculating compensation data for compensating for spatial print engine non-uniformity of an image applied by a print engine to a receiver useful with the present invention.

In step 1210, a test target (e.g. target 1100) is selected. The test target has at least two test areas (e.g. uniform-density images 1102, 1104) of different output densities. The test target can be a full-, multi- or partial-page target. Each test area can be a full-, multi- or partial-page area. The optical densities correspond to output pixel levels 420 (FIG. 7), i.e. are the desired densities of the print. Each test area has a single output pixel level, and includes a plurality of pixel locations.

In an embodiment, the output densities for the test target are selected based on selected tonescale characteristics, as discussed above. For example, output densities in the target can be more closely spaced in areas where the human visual system is more sensitive, and therefore more accurate compensation is needed.

In step 1220, a relationship between output density and output pixel level for the print engine is determined. In an embodiment, this includes calculating an overall tone reproduction curve (TRC) for a section of the surface of the receiver greater than e.g. 15,483.84 mm$^2$ (24 in$^2$) or 51,612.8 mm$^2$ (80 in$^2$). This advantageously permits performing non-uniformity compensation without compounding compensation with inherent non-linearities of print engine 470 (FIG. 7).

In step 1230, the output pixel level for each test area is calculated from the respective output density selected in step 1210 using the relationship determined in step 1220. This step can be performed by tone-reproduction unit 620 (FIG. 6).

In step 1240, print engine 470 is used to apply the test target to receiver 42. Print engine 470 applies to the receiver 42 at each engine pixel location in each test area an amount of toner corresponding to the output pixel level 420 of the test area. Note that the toner amount desired to be applied at an engine pixel location is directly correlated with screened pixel level 460, which is itself correlated with output pixel level 420.

The toner amount applied at each engine pixel location also corresponds to the print engine non-uniformity. That is, the toner amount actually applied by print engine 470 is not necessarily directly or exclusively correlated with the corresponding output pixel level 420. Non-uniformities introduce noise in the relationship between deposited toner amount and screened pixel level 460, and thus in the relationship between deposited toner amount and output pixel level 420.

The application of toner produces a reproduced optical density at each pixel site, measured as $-\log_{10}$(relative reflectance), where relative reflectance of 1.0 represents a perfect diffuse reflector). Each test area is intended to have a uniform optical density throughout, but non-uniformities can cause multiple, different reproduced densities to exist in a test area.

In step 1250, the reproduced densities of the test areas are measured at a plurality of different locations in each area. These locations can be areas as small as a single engine pixel or as large as a full test area.

In step 1260, a processor in or separate from printer 100 is used to calculate the compensation data for correction value unit 720 using the measured densities from step 1250. The compensation data defines a relationship between an output pixel location 421 on the receiver 42, an output pixel level 420, and a compensated pixel level 540 (FIG. 7). Compensation data values can be calculated e.g. by splining the measurements against output pixel level 420 and inverting the spline or by singular value decomposition.

Separating compensation from the TRC can advantageously reduce the complexity of the compensation data, as it removes significant non-linearities, e.g. those due to dot gain and the inherent non-linearity of the human visual system. It reduces the range of variability in a printed target (e.g. target 1100), permitting the use of lower-range, higher-sensitivity scanners to measure the reproduced densities. Combined TRC and compensation systems, by contrast, can require sufficient scanner range to account for both non-uniformities and non-linearities in the print, resulting in reduced sensitivity unless more expensive, higher-sensitivity hardware is employed.

Figure 13:
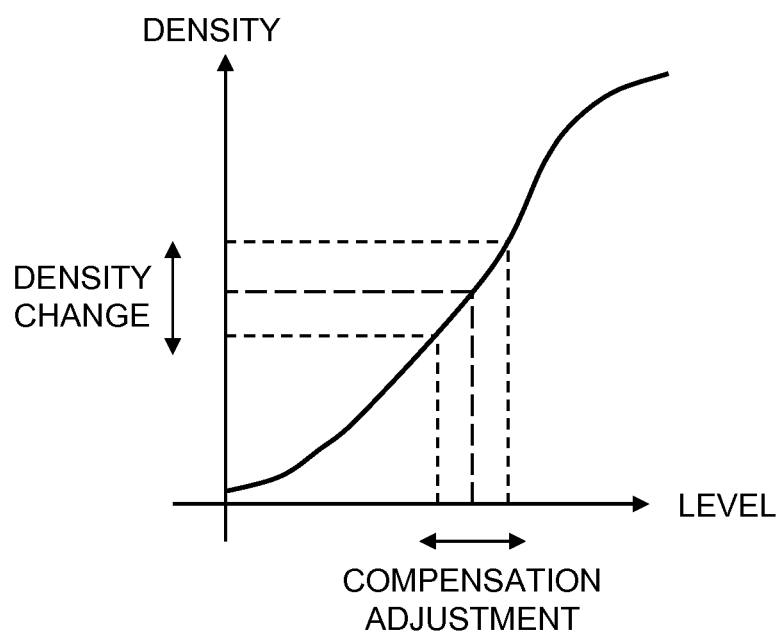
FIG. 13 is a representative plot of reproduced density versus screened pixel level.

FIG. 13 is a representative plot of reproduced density (ordinate) versus output pixel level 420 (abscissa). Adjustments of the pixel level ("compensation adjustment") result in variations of the density ("density change"), as shown. This curve is determined in step 1220 (FIG. 12), and desired densities are mapped through the inverse of the curve (from ordinate to abscissa) to select output pixel levels 420 for the uniform-density areas on target 1100 (FIG. 11).

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 31, 32, 33, 34, 35 printing module
40 supply unit
42, 42A, 42B receiver
50 transfer subsystem
60 fuser
62 fusing roller
64 pressure roller
66 fusing nip
68 release fluid application substation
69 output tray
99 logic and control unit (LCU)
100 printer
101 transport web
102, 103 roller
104 transmission densitometer
105 power supply
106 cleaning station
109 interframe area
110 light beam
111, 121, 131, 141, 151 imaging member
112, 122, 132, 142, 152 transfer member
113, 123, 133, 143, 153 transfer backup member
124, 125 corona tack-down chargers
201 transfer nip
202 second transfer nip
206 photoreceptor
210 charging subsystem
211 meter
212 meter
213 grid
216 surface
220 exposure subsystem
225 development station
226 toning shell
227 magnetic core
238 print image
240 power source
400 input pixel levels
405 workflow inputs
410 image-processing path
420 output pixel levels
421 output pixel locations
450 screening unit
460 screened pixel levels
470 print engine
530 compensator
540 compensated pixel levels
530 compensator
540 compensated pixel levels
610 controller
620 tone-reproduction unit
635 LUT
650 feedback path
710 shift operation
720 correction value unit
725 engine address logic
730 operation
740 screen memory
745 screening address logic
810 dot shape
820 dot shape
830 dot shape
910 tile
920 screen cell
930, 931, 932 engine pixel
1010 bounding parallelogram
1075 crossover
1100 target
1102, 1104 uniform-density image
1106, 1108 alignment mark
1210 step select test target
1220 step determine density-level relationship
1230 step calculate level
1240 step apply target to receiver
1250 step measure densities
1260 step calculate compensation data
$R_n$-$R_{(n-6)}$ receivers
S slow-scan direction

The invention claimed is:

1. Screened hardcopy reproduction apparatus for applying toner to a receiver, comprising:
   a. a print engine for applying the toner to the receiver, wherein the print engine may not apply toner uniformly in a selected area, whereby the toner applied to the receiver has a non-uniformity;
   b. a controller for receiving an input pixel level and a corresponding input pixel location;
   c. a tone-reproduction unit for calculating an output pixel level from the input pixel level and a corresponding output pixel location from the input pixel location;
   d. a compensator for using a selected non-uniformity compensation function to determine a compensated pixel level responsive to the output pixel level and the output pixel location, wherein different non-uniformity compensation functions are selected for use with different selected screening patterns having different dot shapes, the non-uniformity compensation functions being adapted to compensate for any non-uniformities in the toner applied to the receiver by the print engine; and e. a screening unit for calculating a screened pixel level and a screened pixel location from the compensated pixel level, the output pixel location, and the selected screening pattern;

f. wherein the print engine applies an amount of the toner corresponding to the screened pixel level and the non-uniformity to the receiver at a toner location corresponding to the screened pixel location so that the non-uniformity is compensated for.

2. The apparatus according to claim 1, wherein the output pixel level has an output-level bit depth, the compensated pixel level determined by the non-uniformity compensation function has a compensated-level bit depth, and the compensated-level bit depth is greater than the output-level bit depth.

3. The apparatus according to claim 1, wherein the non-uniformity compensation function is a parameterized function, and wherein the output pixel location and the output pixel level are inputs to the parameterized function and the correction value is an output of the parameterized function.

4. The apparatus according to claim 1, wherein the print engine includes:
   i) a photoreceptor;
   ii) a charging subsystem for electrostatically charging the photoreceptor;
   iii) an exposure subsystem for image-wise modulating the charge on the photoreceptor to form a latent image;
   iv) a development subsystem electrically biased to cause the toner to be attracted to the latent image to develop the latent image into a visible image on the photoreceptor; and
   v) a transfer station adapted to transfer the toner from to photoreceptor to the receiver to form a print image on the receiver.

5. The apparatus according to claim 4, further including a fuser for causing the toner of the print image to adhere to the receiver.

6. The apparatus according to claim 1, wherein the selected screening pattern includes a plurality of different dot shapes, and the screening unit selects one of the plurality of different dot shapes based on the compensated pixel level.

7. The apparatus according to claim 1, wherein the screened pixel level has a screened-level bit depth greater than one bit and the selected screening pattern includes three different screened pixel levels.

8. The apparatus according to claim 1, wherein the dot shape is a line, the screening pattern includes a screen angle, and the controller is adapted to apply more accurate compensation when the screen angle is near 90° than when the screen angle is near 0°.

9. The apparatus according to claim 1, wherein the non-uniformity includes a streak that darkens the print for output pixel values greater than a crossover output pixel value and lightens the print for output pixel values less than the crossover output pixel value.

10. The apparatus according to claim 1, wherein the dot shape is a line, the screening pattern includes a screen angle, and the controller is adapted to apply error diffusion when the screen angle is near 90° but not when the screen angle is near 0°.

11. The apparatus according to claim 1, wherein the non-uniformity compensation function is a two-dimensional lookup table indexed by a first dimension of the output pixel location and by the output pixel level.

12. The apparatus according to claim 1, wherein the non-uniformity compensation function is a three-dimensional lookup table indexed by a first dimension of the output pixel location, by a second dimension of the output pixel location and by the output pixel level.

* * * * *